March 12, 1935.  A. H. KILNER  1,994,396
PROCESS FOR THE PRODUCTION OF FOILS AND FILMS
FROM VISCOSE OR OTHER CELLULOSIC SOLUTION
Filed Nov. 28, 1933
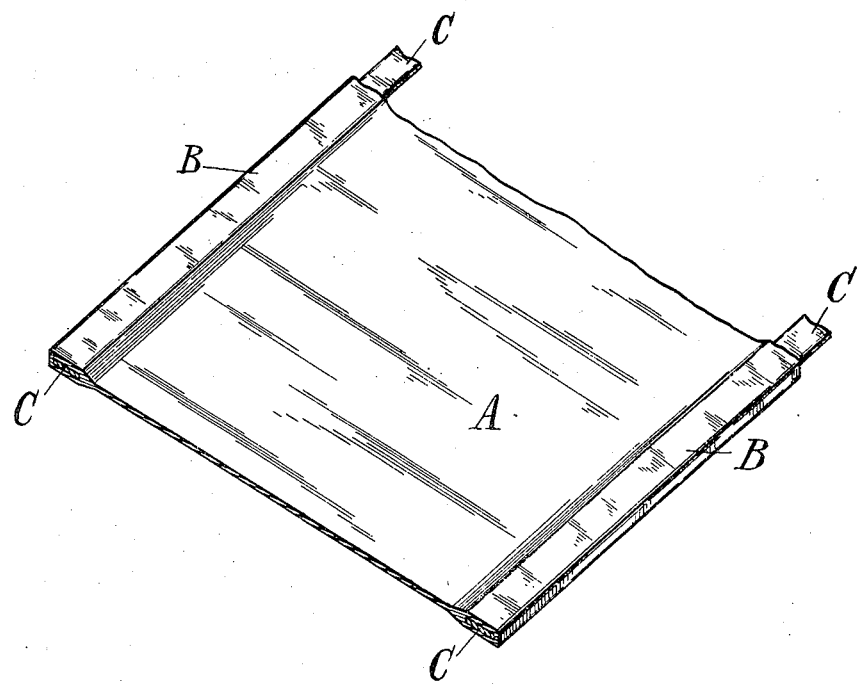
Inventor
Arthur Hugoe Kilner
by his attorneys
Howson and Howson Patented Mar. 12, 1935

1,994,396

UNITED STATES PATENT OFFICE 1,994,396

PROCESS FOR THE PRODUCTION OF FOILS AND FILMS FROM VISCOSE OR OTHER CELLULOSIC SOLUTION

Arthur Hugoe Kilner, St. John's Wood, England

Application November 28, 1933, Serial No. 700,142
In Great Britain December 1, 1932

3 Claims. (Cl. 18—57)

This invention relates to the process for the production of foils and films (hereinafter referred to as the film) from viscose, or other cellulosic solution (hereinafter referred to as viscose) wherein the viscose contained in a vessel issues therefrom through a fine slit of any desired width and size of opening into and through a coagulating bath from which it is drawn under, or over, and/or between rollers which convey and/or subject the so far produced film to further treatment, or treatments. Owing to the thinness of the film being produced it often breaks under tension, (particularly at the marginal edges) such for example as when issuing or being drawn from the slit in the vessel containing the viscose towards, into and through the coagulating bath and thereafter when being drawn under, over or between the aforesaid rollers and consequently considerable wastage occurs in the production of the films. In order to obviate this objection it has been proposed to enlarge the end portions of the aforesaid slit to permit a greater quantity of viscose to pass through these portions with the result that the marginal edge portions of the film are substantially thicker than the main portion thereof so that the said film is more capable of withstanding the tensile strain to which it is ordinarily subjected. Usually the thickest portions of the film are at their extreme edges and merge therefrom into the normal thickness of the main portion of the film. During, or after, the final stage of producing the film the thickened edges thereof are cut off. The width of these thickened edges may vary, for example, each of the said edges may be about three inches in width and as these thickened edges are cut off as waste there is still a very considerable amount of wastage from this cause.

This invention has for its object to provide an improved process whereby the aforesaid wastage is considerably reduced and the liability of the film breaking during the process of its production is further reduced or eliminated.

According to this invention the marginal edges of the film are reinforced by strips of material introduced during the production of the said film. This may be effected by drawing through the vessel containing the viscose and through the end portions of the slit or orifice therein, substantially narrow strips of fabric, paper or other suitable material capable of withstanding the tensile strain to which the film is liable to be subjected during its production. The width of the end portions of the slit through which the strips of reinforcing material pass may therefore be less than the width of the slit hitherto employed in the production of films with thickened edges, but the said end portions are preferably open to such an extent as will permit the said strips retaining on their surfaces a covering of viscose equal, or approximately equal, in thickness to that of the viscose issuing through the main portion of the width of the said slit. In the production of films by the use of a slit of approximately forty inches in width each of the reinforcing strips may, for example, be of about one inch in width. It will be seen therefore, that in addition to the increased strength obtained by providing the film with reinforced marginal edges which ensures such edges of the film against breakage there is considerably less wastage in the film produced as the reinforced edges which are cut off are of substantially less width than the edge portions hitherto cut off and whereas these have been treated as waste, the reinforced edges so cut off can be used for various useful purposes, for example, they may be used as binders.

The accompanying drawing illustrates diagrammatically in perspective a portion of the length of a film made in accordance with this invention, wherein A is the film and B its thickened marginal edges reinforced by narrow strips of material C embedded therein.

During the production of films, according to the known processes, considerable shrinkage occurs. The provision of the reinforced material in the marginal edges of the film in accordance with this invention permits the employment of means which engage the said edges and act either to stretch the film laterally during its production, to prevent lateral shrinkage of the film or to permit lateral shrinkage to a predetermined extent.

Having now particularly described and ascertained the nature of my said invention and in what manner the same is to be performed I declare that what I claim is:—

1. In a process of reinforcing the marginal edges of foils and films made from viscose or other cellulosic solution, the steps of leading strips of fabric, paper or other material through the solution in the vessel from which the film issues through a fine slit and drawing the strips through enlarged openings at the ends of the slit with the strips completely covered by the material of the film.

2. In a process of reinforcing the marginal edges of foils and films made from viscose or other cellulosic solution, the steps of leading strips of fabric, paper or other material through the solution in the vessel from which the film issues through a fine slit and drawing the strips through enlarged openings at the ends of the slit with the strips completely covered by a coating of the solution substantially equal in thickness, on coagulation, to the foil or film issuing through the main portion of the slit.

3. A foil or film having marginal strips of reinforcing material incorporated therein, said strips being covered completely by a coating of the same thickness as the film between said strips.

ARTHUR HUGOE KILNER.